United States Patent
Destro et al.

(10) Patent No.: US 10,323,141 B2
(45) Date of Patent: Jun. 18, 2019

(54) PROPYLENE POLYMER COMPOSITIONS

(71) Applicant: Basell Poliolefine Italia S.r.l., Milan (IT)

(72) Inventors: Mara Destro, Ferrara (IT); Marco Ciarafoni, Ferrara (IT); Paola Massari, Ferrara (IT); Stefano Squarzoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/385,019

(22) PCT Filed: Mar. 12, 2013

(86) PCT No.: PCT/EP2013/054934
§ 371 (c)(1),
(2) Date: Sep. 12, 2014

(87) PCT Pub. No.: WO2013/135654
PCT Pub. Date: Sep. 19, 2013

(65) Prior Publication Data
US 2015/0045514 A1  Feb. 12, 2015

Related U.S. Application Data

(60) Provisional application No. 61/610,305, filed on Mar. 13, 2012.

(30) Foreign Application Priority Data

Mar. 13, 2012  (EP) .................................. 12159132

(51) Int. Cl.
*C08L 23/16* (2006.01)
*C08L 23/14* (2006.01)

(52) U.S. Cl.
CPC ............. *C08L 23/16* (2013.01); *C08L 23/142* (2013.01); *C08L 23/14* (2013.01); *C08L 2201/10* (2013.01); *C08L 2205/02* (2013.01); *C08L 2205/025* (2013.01)

(58) Field of Classification Search
CPC .. C08L 2205/02; C08L 23/08; C08L 23/0807; C08L 23/14; C08L 23/142
See application file for complete search history.

(56) References Cited

U.S. PATENT DOCUMENTS

| 7,166,677 | B2 | 1/2007 | Doi et al. |
| 2004/0054098 | A1* | 3/2004 | Weng ............... C08F 210/06 526/73 |
| 2009/0292077 | A1 | 11/2009 | Miyaguchi et al. |

FOREIGN PATENT DOCUMENTS

| CN | 1670071 A | 9/2005 |
| CN | 101585944 A | 11/2009 |
| EP | 2022824 A1 | 2/2009 |
| EP | 2264099 A1 | 12/2010 |
| WO | WO03/046021 A1 | 6/2003 |

OTHER PUBLICATIONS

Ulery, B.D. et al. Journal of Polyemr Science Part B: Polymer Physics vol. 49 pp. 832-864 (May 2011).*
PCT International Search Report & Written Opinion dated Apr. 9, 2013, for PCT/EP2013/054934.
Chemical Industry Handbook, Resins and Plastics, Zhongliang Dong eds., Chemical Industry Press, Published Apr. 30, 2008 (Apr. 30, 2008).

* cited by examiner

*Primary Examiner* — Irina S Zemel
*Assistant Examiner* — Jeffrey S Lenihan

(57) ABSTRACT

Propylene polymer compositions comprising:
A) from 70 wt % to 95 wt %, of a random copolymer of propylene with ethylene, containing from 3.5 wt % to 8.5 wt %, of ethylene derived units, having a content of fraction soluble in xylene at 25° C. comprised between 7.1 wt % and 15.2 wt % and having a melting point higher than 142.0° C.;
B) from 5 wt % to 35 wt %, of a copolymer of propylene with ethylene, containing from 8.5 wt % to 17.0 wt % of ethylene derived units;
the sum A+B being 100; the melt flow rate, MFR (ISO 1133 (230° C., 2.16 kg).) from 0.6 g/10 min to 20.2 g/10 min.

11 Claims, No Drawings

PROPYLENE POLYMER COMPOSITIONS

This application is the U.S. National Phase of PCT International Application PCT/EP2013/054934, filed Mar. 12, 2013, claiming benefit of priority to European Patent Application No. 12159132.5, filed March 13, 2012, and benefit of priority under 35 U.S.C. § 119(e) of U.S. Provisional Application No. 61/610,305 filed Mar. 13, 2012, the contents of which are incorporated herein by reference in their entirety.

FIELD OF THE INVENTION

The present invention relates to a propylene polymer composition having improved flexural modulus, impact strength and excellent optical properties.

BACKGROUND OF THE INVENTION

As is known, the isotactic polypropylene is endowed with an exceptional combination of excellent properties which render it suitable for a very great number of uses.

In order to improve the properties of the isotactic polypropylene the crystallinity of the propylene homopolymer is decreased by copolymerization of the propylene with small quantities of ethylene and/or α-olefins such as 1-butene, 1-pentene and 1-hexene. In this manner one obtains the so called random crystalline propylene copolymers which, when compared to the homopolymer, are essentially characterized by better flexibility and transparency. Propylene random copolymers, however, although they have good transparency, do not offer, especially at low temperatures, sufficiently better impact resistance than the homopolymer which can be satisfactory used for the applications listed above.

It has been known for a long time that the impact resistance of polypropylene can be improved by adding an adequate quantity of elastomeric propylene-ethylene copolymer to the homopolymers by mechanical blending or sequential polymerization. However, this improvement is obtained at the expenses of the transparency of the material.

To avoid this inconvenient, U.S. Pat. No. 4,634,740 suggests the blending of the polypropylene, in the molten state, with propylene-ethylene copolymers obtained with specific catalysts, and having an ethylene content ranging from 70 to 85% by weight. However, said compositions present transparency values (Haze) substantially comparable to those of the propylene homopolymer. Said patent, therefore, does not teach how to obtain compositions having good transparency.

EP-A-0557953, describes polyolefin compositions where one obtains a good balance of transparency, stiffness, and impact resistance even at low temperatures, by modifying a crystalline random copolymer of propylene with the proper quantities of a mechanical mixture comprising an elastomeric copolymer and one or more polymers chosen from LLDPE, LDPE and HDPE.

WO 01/92406 describes a propylene polymer composition comprising (percent by weight):
A) from 70 to 90%, of a random copolymer of propylene with ethylene, containing from 1 to 6%, of ethylene, having a content of fraction insoluble in xylene at room temperature of not less than 93;
B) from 10% to 30%, of a copolymer of propylene with ethylene, containing from 8 to 18%, of ethylene;
wherein the ratio (B)/$C^2_B$ of the percent by weight of (B), with respect to the total weight of (A) and (B), to the percent by weight of ethylene in (B), with respect to the total weight of (B), represented in the above formula by $C^2_B$, is 2.5 or lower. The MFR L ranges from 0.5 to 50 g/10 min. This composition shows a good transparency but it can be improved by fine tuning the variables of the composition.

The applicant found a propylene polymer composition having a particular balance among the various parameter so that to obtain improved values of flexural modulus, good values of haze and good resistance to impact.

SUMMARY OF THE INVENTION

Thus one object of the present invention is a propylene polymer composition comprising:
A) from 70 wt % to 95 wt %, preferably from 75 wt % to 93 wt %, more preferably from of 80 wt % to 91 wt % of a random copolymer of propylene with ethylene, containing from 3.5 wt % to 8.5 wt %, preferably from 4.0 wt % to 5.5 wt %, of ethylene derived units, having a content of fraction soluble in xylene at 25° C. comprised between 7.1 wt % and 15.2 wt %; preferably from 9.5 wt % to 13.2 wt %; and having a melting point higher than 142.0° C. more preferably higher than 143.0° C.; even more preferably higher than 144.0.° C. measured by DSC; the upper limit of the melting point being 155.0° C. preferably 150.0° C. more preferably 148.3° C.;
B) from 5 wt % to 35 wt %, preferably from 8 wt % to 25 wt %, more preferably from 11 wt % to 14 wt % of a copolymer of propylene with ethylene, containing from 8.5 wt % to 17.0 wt %, preferably from 8.8 wt % to 14.7 wt %, of ethylene derived units;
the sum A+B being 100;
wherein the melt flow rate, MFR. (ISO 1133 (230° C., 2.16 kg).) ranges from 0.6 g/10 min to 20.2 g/10 min; preferably from 0.8 g/10 min to 5.0 g/10 min; more preferably from 1.0 g/10 min to 3.2 g/10 min;

DETAILED DESCRIPTION OF THE INVENTION

The term "copolymer" includes polymers containing only propylene and ethylene.

The present invention is preferably endowed with one or more of the following features:
Intrinsic Viscosity [η] of the fraction (of the overall composition) soluble in xylene at 25° C. ranges from 1 to 4.5, more preferably from 1.3 to 4 dl/g.
the fraction (of the overall composition) soluble in xylene at 25° C. ranges from 10.3 wt % to 18.5 wt %
a Flexural Modulus of the unucleated composition higher than 700 MPa;
Haze of the unucleated composition measured on 50 μm film lower than 4.1% preferably lower than 3.2% more preferably lower than 2.8% .

Component A) of the composition of present invention are obtainable by polymerizing propylene and ethylene by a gas-phase polymerization process carried out in at least two interconnected polymerization zones. The process comprising feeding propylene and ethylene to said polymerization zones in the presence of a highly stereospecific heterogeneous Ziegler-Natta catalyst system under reaction conditions and collecting the polymer product from said polymerization zones, in which process the growing polymer particles flow upward through one of said polymerization zones (riser) under fast fluidization conditions, leave said riser and enter another polymerization zone (downcomer) through which they flow downward under the action of gravity, leave said downcomer and are reintroduced into the riser, thus establishing a circulation of polymer between the riser and the downcomer, whereby means are provided which are capable of totally or partially preventing the gas mixture present in the riser from entering the downcomer and a gas and/or liquid mixture having a composition different from the gas mixture present in the riser is introduced into the downcomer; This process is described for example in EP 1 012 195

Therefore by using the polymerization process described below it is possible to obtain the polymer component A) that is multimodalized in composition, i.e. the resulting polymer contains various fractions having different comonomer content among these the fractions having a low content of comonomers being responsible of the high melting point.

The polymer component A) can be then feed to a gas phase reactor for the preparation on component B) so that to achieve a two steps process.

Such polymerisation can be carried out in the presence of Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminium compound, such as an aluminium alkyl compound.

An external donor is optionally added.

The catalysts generally used in the process of the invention are capable of producing polypropylene homopolymer with a value of xylene insolubility at ambient temperature greater than 90%, preferably greater than 95%.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are esters of phthalic acid and 1,3-diethers of formula:

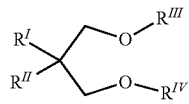

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published European patent applications 361493 and 728769. Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis (methoxymethyl) fluorene.

Other suitable electron-donor compounds are phthalic acid esters, such as diisobutyl, dioctyl, diphenyl and benzylbutyl phthalate.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are (tert-butyl)$_2$Si (OCH$_3$)$_2$, (cyclohexyl)(methyl)Si (OCH$_3$)$_2$, (cyclopentyl)$_2$Si(OCH$_3$)$_2$ and (phenyl)$_2$Si(OCH$_3$)$_2$ and (1,1,2-trimethylpropyl)Si(OCH$_3$)$_3$.

1,3-diethers having the formulae described above can also be used advantageously. If the internal donor is one of these diethers, the external donors can be omitted.

In particular, even if many other combinations of the previously said catalyst components may allow to obtain propylene polymer compositions according to the present invention, the terpolymers are preferably prepared by using catalysts containing a phthalate as internal donor and (cyclopentyl)$_2$Si(OCH$_3$)$_2$ as outside donor, or the said 1,3-diethers as internal donors.

Preferably said polypropylene composition being obtainable with a polymerization process carried out in the presence of a catalyst system comprising the product obtained by contacting (a) a solid catalyst component having preferably average particle size ranging from 15 to 80 μm comprising a magnesium halide, a titanium compound having at least a Ti-halogen bond and at least two electron donor compounds one of which being present in an amount from 40 to 90% by mol with respect to the total amount of donors and selected from succinates and the other being selected from 1,3 diethers, (b) an aluminum hydrocarbyl compound and optionally (c) an external electron donor compound.

As previously said, the polymerization process can be carried out in at least two sequential steps, wherein components A) and B) are prepared in separate subsequent steps, operating in each step, except the first step, in the presence of the polymer formed and the catalyst used in the preceding step. The catalyst is generally added only in the first step, however its activity is such that it is still active for all the subsequent step(s).

Component A) is preferably prepared before component B).

The regulation of the molecular weight is carried out by using known regulators, hydrogen in particular.

By properly dosing the concentration of the molecular weight regulator in the relevant steps, the previously described MFR and [η] values are obtained.

The whole polymerization process, which can be continuous or batch, is carried out following known techniques and operating in liquid phase, in the presence or not of inert diluent, or in gas phase, or by mixed liquid-gas techniques. It is preferable to carry out the propylene copolymerization step(s) for preparation of component A) in liquid propylene as diluent, and the other polymerization step(s) in gas phase. Generally there is no need for intermediate steps except for the degassing of unreacted monomers.

Reaction time, pressure and temperature relative to the two steps are not critical, however it is best if the temperature is from 20 to 100° C. The pressure can be atmospheric or higher.

The catalysts can be pre-contacted with small amounts of olefins (prepolymerization).

The compositions of the present invention can also be obtained by preparing separately the said components A) and B) by operating with the same catalysts and substantially under the same polymerization conditions as previously explained (except that a wholly sequential polymerization process will not be carried out, but the said components and fractions will be prepared in separate polymerization steps) and then mechanically blending said components and fractions in the molten or softened state. Conventional mixing apparatuses, like screw extruders, in particular twin screw extruders, can be used.

The compositions of the present invention can also contain additives commonly employed in the art, such as antioxidants, light stabilizers, heat stabilizers, nucleating agents, colorants and fillers. In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert.-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as Flexural Modulus and HDT. Talc can also have a nucleating effect.

The compositions of the present invention are particularly suited for the production of injection molding articles in particular medical articles in view of the transparency of the composition that is maintained even after the sterilization at high temperature.

The particulars are given in the following examples, which are given to illustrate, without limiting, the present invention.

EXAMPLES

Melt Flow Rate
Determined according to ISO 1133 (230° C., 2.16 kg).
Ethylene Content of the Polymers (C2 Content)
Ethylene content has been determined by IR spectroscopy.
The spectrum of a pressed film of the polymer is recorded in absorbance vs. wavenumbers ($cm^{-1}$). The following measurements are used to calculate C2 content:

a) Area ($A_t$) of the combination absorption bands between 4482 and 3950 $cm^{-1}$ which is used for spectrometric normalization of film thickness.

b) Area ($A_{C2}$) of the absorption band due to methylenic sequences ($CH_2$ rocking vibration) after a proper digital subtraction of an isotactic polypropylene (IPP) reference spectrum. The range 660 to 790 $cm^{-1}$.

Molar Ratios of the Feed Gases
Determined by gas-chromatography.
Samples for the mechanical analysis
Samples have been obtained according to ISO 294-2
Flexural Modulus
Determined according to ISO 178.
Haze (50 μm film)
Preparation of the Film Specimens
A film with a thickness of 50 μm is prepared by extruding the polymer in a single screw Collin extruder (length/diameter ratio of screw: 25) at a film drawing speed of 7 m/min. and a melt temperature of 210-250° C.
Haze (on 50 μm film):
Determined on 50 μm thick cast films of the test composition. The measurement was carried out on a 50×50 mm portion cut from the central zone of the film.

The instrument used for the test was a Gardner photometer with Haze-meter UX-10 equipped with a G.E. 1209 lamp and filter C. The instrument calibration was made by carrying out a measurement in the absence of the sample (0% Haze) and a measurement with intercepted light beam (100% Haze).

Melting Temperature, Melting Enthalpy and Crystallization Temperature
Determined by differential scanning calorimetry (DSC). A sample weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, melting temperatures is read.

Xylene Soluble and Insoluble Fractions at 25° C. (room temperature)
2.5 g of polymer and 250 $cm^3$ of xylene are introduced in a glass flask equipped with a refrigerator and a magnetic stirrer. The temperature is raised in 30 minutes up to the boiling point of the solvent. The so obtained clear solution is then kept under reflux and stirring for further 30 minutes. The closed flask is then kept for 30 minutes in a thermostatic water bath at 25° C. for 30 minutes. The so formed solid is filtered on quick filtering paper. 100 $cm^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated. The percent by weight of polymer insoluble in xylene at room temperature is considered the Isotacticity Index of the polymer.

Intrinsic Viscosity (I.V.)
Determined in tetrahydronaphthalene at 135° C.
IZOD Impact Strength
Determined according to ISO 180/1A
Hexane Soluble Fraction
10 g of material are placed in a 250 ml glass flask with a ground-glass neck. 100 ml of hexane are added and let boil under reflux condenser for 4 hours, stirring constantly. After cooling in iced water the solution is filtered through a sintered-glass filter maintaining the solution at 0° C. 20 ml of the filtrate is evaporated in a tared glass dish. The residuate is dried in an oven at 100° C. to 105° C. for 1 hour then weighted.

Sterilization Pprocedure

The sample is placed in a steam sterilization autoclave Systec DX-65 set at 121 degree Celsius and 2.1 bar of nitrogen internal pressure. After 20 minutes of treatment in the autoclave, the item is let cool down to room temperature and conditioned at room temperature for 48 hours before testing.

Preparation of Solid Catalyst Component A

Into a 500 mL four-necked round flask, purged with nitrogen, 250 mL of $TiCl_4$ were introduced at 0° C. While stirring, 10.0 g of microspheroidal $MgCl_2 \cdot 2.8C_2H_5OH$ (prepared according to the method described in ex.2 of U.S. Pat. No. 4,399,054) and 7.4 mmol of 9,9-bis(methoxymethyl) fluorene were added. The temperature was raised to 100° C. and maintained for 120 min. Then, the stirring was discontinued, the solid product was allowed to settle and the supernatant liquid was siphoned off. Then 250 mL of fresh $TiCl_4$ were added. The mixture was reacted at 120° C. for 60 min and, then, the supernatant liquid was siphoned off. The solid was washed six times with anhydrous hexane (6×100 mL) at 60° C. Finally, the solid was dried under vacuum and analyzed. The resulting solid catalyst component contained: Ti=3.5% by weight, 9,9-bis(methoxymethyl)fluorene=18.1% by weight.

Preparation of Solid Catalyst Component B

Into a 500 mL four-necked round flask, purged with nitrogen, 250 mL of $TiCl_4$ were introduced at 0° C. While stirring, 10.0 g of microspheroidal $MgCl_2 \cdot 2.1C_2H_5OH$ having average particle size of 47 μm (prepared according to the method described in ex.2 of U.S. Pat. No. 4,399,054) an amount of diethyl 2,3-diisopropylsuccinate such as to have a Mg/succinate molar ratio of 15 were added. The temperature was raised to 100° C. and kept at this value for 60 min. After that the stirring was stopped, the liquid was siphoned off. After siphoning, fresh $TiCl_4$ and an amount of 9,9-bis (methoxymethyl)fluorene such as to have a Mg/diether molar ratio of 30 were added. Then the temperature was raised to 110° C. and kept for 30 minutes under stirring. After sedimentation and siphoning at 85° C., fresh TiCl4 was added. Then the temperature was raised to 90° C. for 15 min. After sedimentation and siphoning at 90° C. the solid was washed six times with anhydrous hexane (6×100 ml) at 60° C.

Preparation of the Catalyst System

Before introducing it into the polymerization reactors, the solid catalyst components A and B described above are contacted at 15° C. for 30 minutes with aluminum-triethyl (TEAL) and cyclohexyl-methyl-dimethoxysilane (CHMMS) used as external donor

Polymerization Examples 1 And Comparative Example 2

The polymerization runs were conducted in continuous in a series of two reactors equipped with devices to transfer the product from one reactor to the one immediately next to it. The first reactor is a polymerisation apparatus as described in EP 1 012 195.

The catalyst is sent to the polymerization apparatus that comprises two interconnected cylindrical reactors, riser and downcomer. Fast fluidisation conditions are established in the riser by recycling gas from the gas-solid separator. The obtained product is then feed to a fluid bed gas phase reactor. Hydrogen was used as molecular weight regulator. The gas phase (propylene, ethylene and hydrogen) is continuously analyzed via gas-chromatography.

At the end of the run the powder was discharged, dried in an oven at 60° C. under a nitrogen flow and pelletized. The polymerization parameters are reported in table 1.

TABLE 1

|  |  | Example | |
|---|---|---|---|
|  |  | 1 | Comp 2 |
| Solid catalyst component<br>Component A) |  | B | A |
| TEAL/external donor | wt/wt | 4.3 | 6 |
| TEAL/catalyst | wt/wt | 8.4 | 7.5 |
| Temperature | ° C. | 73 | 72 |
| Pressure | bar-g | 28 | 27 |
| Split holdup   riser | wt % | 28 | 38 |
| downcomer | wt % | 72 | 62 |
| $C_3$ riser | mole % | 81 | 76 |
| $C_2$ riser | mole % | 3.6 | 2.5 |
| $H_2/C_3$ riser | mol/mol | 0.006 | 0.002 |
| $C_2/(C_2 + C_3)$Riser | mol/mol | 0.045 | 0.032 |
| $C_2$ downcomer |  | 1.1 |  |
| $H_2/C_3$ downcomer |  | 0.006 |  |
| $C_2/(C_2 + C_3)$downcomer |  | 0.012 |  |
| Component B (gas phase reactor) |  |  |  |
| Temperature | ° C. | 75 | 80 |
| Pressure | Bar-g | 16 | 15 |
| $C_2/C_2 + C_3$ | mol/mol | 0.08 | 0.085 |
| $H_2/C_2^-$ | mol/mol | 0.363 | 0.15 |

$C2^-$ = ethylene;
$C3^-$ = propylene;
H2 = hydrogen

Comparative Example 3

Comparative example 3 is example 1 of WO 01/92406.

TABLE 2

| analysis of the polymer | | | | |
|---|---|---|---|---|
|  |  |  | Ex | |
|  |  | Example 1 | Comp ex 2 | Comparative example 3 |
| Component A |  |  |  |  |
| MFR | g/10' | 1.7 | 1.2 | 1.7 |
| C2 | % | 4.2 | 4.8 | 2.5 |
| XS | % | 10.9 | 9.2 | 5.3 |
| Tm | ° C. | 144.3 | nm | nm |
| Component B |  |  |  |  |
| Amount of component B | wt % | 14 | 11.4 | 19 |
| Amount of C2 in component B | wt % | 9.0 | 9.0 | nm |
| Total composition |  |  |  |  |
| C2 content | wt % | 4.9 | 5.2 | 5.3 |
| Xylene Solubles | % | 13.3 | 14.4 | 13.4 |
| XSIV | dl/g | 1.50 | 1.42 | 3.6 |
| Melt Flow Rate | g/10' | 1.83 | 1.1 | 1.30 |
| Flexural Modulus | MPa | 773 | 711 | 715 |
| Flexural Modulus after ster. | MPa | 867 | 776 | nm |
| Izod Impact 23° C. | kJ/m2 | 18.8 | 38.9 | nm |
| Izod Impact 0° C. | kJ/m2 | 6.3 | 7.6 | nm |
| Izod Impact −20° C. | kJ/m2 | 2.9 | 3.4 | nm |
| Stress at break | MPa | 30.4 | 29.7 | nm |
| Elongation at break | % | 566 | 470 | nm |
| DSC Tm | ° C. | 144.3 | 134.3 | nm |

TABLE 2-continued analysis of the polymer

| | | Ex | | |
|---|---|---|---|---|
| | | Example 1 | Comp ex 2 | Comparative example 3 |
| DSC Tc | °C. | 95.7 | 89.3 | nm |
| DSC Hm | J/g | 66.5 | 65.0 | nm |
| C6– extr. on pellets (pharmacopeia) | % | 3.2 | 2.4 | nm |
| Haze on 50 m cast film | % | 2.4 | 2.0 | 8.2 |
| Haze on 50 m cast film after ster. | % | 15.5 | 15.8 | nm |

C2 = ethylene;
C3 = propylene;
nm = not measured

From table 2 clearly results that the composition according to the present invention shows an improved flexural modulus with respect to comparative example 1 and furthermore a better haze on film with respect to comparative example 2 having the same total content of ethylene derived units (4.9 vs 5.2).

What is claimed is:

1. A medical injection molded article comprising a propylene polymer composition comprising:
   A) 70-95 wt % of a random copolymer of propylene with ethylene, comprising 3.5-8.5 wt % of ethylene derived units, having a content of fraction soluble in xylene at 25° C. of 7.1-15.2 wt % and having a melting point higher than 142.0° C.;
   B) 5-35 wt % of a copolymer of propylene with ethylene comprising 8.8 to 14.7 wt. % of ethylene derived units; and
   C) optionally comprising one or more additives:
   wherein the sum of A+B+C is 100;
   the propylene polymer composition comprises a melt flow rate (MFR: ISO 1133 (230° C., 2.16 kg)) of 0.8-5.0 g/10 min.; and the article comprises a haze value as measured on a 50 μm film of lower than 4.1%.

2. The medical injection molded article of claim 1, wherein the fraction of the overall composition soluble in xylene at 25° C. ranges from 10.3 wt % to 18.5 wt %.

3. The medical injection molded article of claim 1, wherein the propylene polymer composition has the intrinsic viscosity [η] of the fraction of the overall composition soluble in xylene at 25° C. ranging from 1-4.5 dl/g.

4. The medical injection molded article of claim 1, having a flexural modulus higher than 700 MPa.

5. The medical injection molded article of claim 1, having a flexural modulus of at least 867 MPa.

6. The medical injection molded article of claim 1, wherein the one or more additives are selected from the group consisting of antioxidants, light stabilizers, heat stabilizers, nucleating agent, colorants and fillers.

7. The medical injection molded article of claim 6, wherein the fillers comprise one or more of talc, calcium carbonate and mineral fibers.

8. The medical injection molded article of claim 6, wherein the nucleating agent comprises 0.05-2.0% by weight of the propylene polymer composition.

9. The medical injection molded article of claim 8, wherein the one or more nucleating agents are selected from p-tert-butyl benzoate, 1,3-dibenzylidenesorbitol and 2,4-dibenzylidenesorbitol.

10. The medical injection molded article of claim 1, wherein the propylene polymer composition comprises a haze value measured on a 50 μm film of lower than 4.1%.

11. The medical injection molded article of claim 1, wherein the propylene polymer composition comprises a haze value measured on a 50 μm film of lower than 2.8%.

* * * * *